US012098489B2

(12) United States Patent
Alpagut et al.

(10) Patent No.: US 12,098,489 B2
(45) Date of Patent: Sep. 24, 2024

(54) TEXTILE PRODUCTION MONITORING SYSTEM WITH A BARCODE READER

(71) Applicants: Realkom Tekstil Urunleri Sanayi Pazarlama Ve Dis Ticaret Anonim Sirketi, Istanbul (TR); Real Solutions Bilisim Teknolojileri Sanayi Ticaret Anonim Sirketi, Duzce (TR)

(72) Inventors: Bisar Alpagut, Duzce (TR); Furkan Ungoren, Istanbul (TR)

( * ) Notice: Subject to any disclaimer, the term of this patent is extended or adjusted under 35 U.S.C. 154(b) by 36 days.

(21) Appl. No.: 18/002,439

(22) PCT Filed: Jun. 30, 2021

(86) PCT No.: PCT/TR2021/050675
§ 371 (c)(1),
(2) Date: Dec. 19, 2022

(87) PCT Pub. No.: WO2022/093150
PCT Pub. Date: May 5, 2022

(65) Prior Publication Data
US 2023/0228020 A1     Jul. 20, 2023

(30) Foreign Application Priority Data

Nov. 2, 2020 (TR) ................................ 2020/17413
Dec. 29, 2020 (TR) ................................ 2020/22149

(51) Int. Cl.
*D05B 19/04*     (2006.01)
*G05B 19/406*    (2006.01)
(Continued)

(52) U.S. Cl.
CPC ........... *D05B 19/04* (2013.01); *G05B 19/406* (2013.01); *G06K 7/10366* (2013.01); *G06K 7/1413* (2013.01); *G05B 2219/45196* (2013.01)

(58) Field of Classification Search
CPC ........ D05B 69/22; D05B 69/24; D05B 69/26; G05B 2219/45195; G05B 2219/45196
See application file for complete search history.

(56) References Cited

U.S. PATENT DOCUMENTS 6,463,352 B1   10/2002   Tadokoro et al.
8,082,866 B2 * 12/2011   Hirose .................... D05C 5/06
                                               112/470.03
(Continued)

FOREIGN PATENT DOCUMENTS

BG         3902 U1 *   10/2020
CN      1744106 A        3/2006
(Continued)

OTHER PUBLICATIONS

International Search Report for corresponding PCT/TR2021/050675 dated Nov. 5, 2021.
(Continued)

*Primary Examiner* — Danny Worrell
(74) *Attorney, Agent, or Firm* — Egbert, McDaniel & Swartz, PLLC

(57) ABSTRACT

A textile production monitoring system includes an electronic device connected with a sewing machine, and with sensors connected with the knife, the pedal, the motor tach of the sewing machine, and with the needle, the sensors transmitting signals to the electronic device. A microprocessor evaluates the four signals received from the sensors in a coordinated way. A software possessing a four-signal algorithm generates information about the products, information on which operator works on which machines for how long, how much product they produce, failure status, and machine efficiency. An Rfid module is connected with the electronic device for monitoring the information and working status of the personnel working on the sewing machine. At least one barcode reader allows for entering information on which (Continued)

order the product sewn in the sewing machine belongs to. A wireless connection module facilitates transfer of the information from the electronic device and the microprocessor wirelessly.

21 Claims, 5 Drawing Sheets

(51) Int. Cl.
    *G06K 7/10* (2006.01)
    *G06K 7/14* (2006.01)

(56) References Cited

U.S. PATENT DOCUMENTS

| | | | | |
|---|---|---|---|---|
| 9,994,984 | B2* | 6/2018 | Schwarzberger | D05B 19/12 |
| 10,240,270 | B2* | 3/2019 | Schwarzberger | D05B 19/14 |
| 11,015,276 | B2* | 5/2021 | Konzak | D05B 11/00 |
| 2003/0060904 | A1 | 3/2003 | Szoke et al. | |
| 2015/0259838 | A1 | 9/2015 | Schwarzberger et al. | |
| 2016/0355964 | A1* | 12/2016 | Conrad | D05B 81/00 |
| 2017/0260666 | A1 | 9/2017 | Schwarzberger | |
| 2023/0228020 | A1* | 7/2023 | Alpagut | G06K 7/10366 |
| | | | | 112/470.04 |

FOREIGN PATENT DOCUMENTS

| | | |
|---|---|---|
| CN | 105734838 A | 7/2016 |
| DE | 102006025747 A1 | 12/2007 |
| JP | 2022515939 A * | 2/2022 |
| TR | 2007/01520 U | 7/2007 |

OTHER PUBLICATIONS

Written Opinion of the International Searching Authority for corresponding PCT/TR2021/050675, dated Nov. 5, 2021.

* cited by examiner

TEXTILE PRODUCTION MONITORING SYSTEM WITH A BARCODE READER

SUBJECT OF THE INVENTION AND TECHNICAL FIELD

This invention relates to an electronic and software system which allows receiving and processing a large number of correct information in textile production. The invention particularly relates to a device and system that instantly receives the correct product information from the sewing machine in textile factories and sends it to the system, and allows receiving bottleneck analysis, operator performance, machine failure status, machine efficiency and other necessary report information with a four-signal system and creating them by evaluating in a coordinated way. The invention, in a broad sense, is an invention that will pave the way for textile production facilities to become smart as it allows receiving more data and evaluating them in a coordinated way within the context of industry 4.0.

This invention also includes an additional development related to integrating into the system a "barcode reader" that will enable the order information of the product to be entered.

STATE OF THE ART

Textile production is a renewed and developed sector with industrialization, and development of modern production techniques. In the state of the art, it is observed that important studies are conducted to keep production and efficiency at the maximum level. Accordingly, mostly it is observed that an individual machine is developed for each section or each work. For example, a sewing machine for closing T-shirt's sides is different, and a sewing machine for sleeve setting is different. Increasing of the machines that undertake different tasks in the production line has necessitated the need for organization and communication. This organization, in small-scale production facilities, is provided by monitoring and analysis of works of the personnel working on the machine by the personnel in charge called as the foreman. In this regard, although the need for personnel increases, the related personnel may be insufficient in large-scale production lines, and the cost increases in case of personnel increase. A sufficient and efficient analysis and monitoring cannot be made due to such reasons. Until today, with the textile production monitoring systems, the product information produced by each personnel has being monitored on digital screens by production counters located on the machine of each employee in the production facility. With these systems providing information on the number of products produced, personnel performance and work load analysis can be made by monitoring the operation or performance of the machine.

In the state of the art, devices used in counting textile products try to determine the number of pieces only by examining the operator's pedal status or by examining the knife signal. In other words, mostly the performance of work machine is monitored. With this work machine, a sewing machine, information such as how long the machine works, how long it stops, and similar information is monitored rather than the working performance of the personnel. There are many disadvantages or deficiencies of a technique in this method. For example, defective or defect-free product cannot be distinguished. Therefore, failing to distinguish defective products means that the actual number cannot be obtained. On the other hand, the time spent by the operator for a product process cannot be determined. Since this is based on the pedal pressing time in the state of the art, it is not possible or very difficult to determine the production information of a machine that works without a pedal. In addition, the time the worker is not working cannot be determined when a failure occurs during production.

In the state of the art, there are studies on the textile production monitoring system. A document come across in the state of the art is the German patent no. DE102006025747. This patent relates to an automatic system for controlling textile machines, comprising a communication network, one or more textile machines and means for controlling textile machines, one or more display/input units (HMI-Man Machine Interface) and wired and/or wireless network communication as well. In this patent, a system for remote control of a system that makes production without necessitating personnel for machines, is designed. Therefore, it is believed that this will not be useful in a facility where production is made with personnel.

Another patent come across in the state of the art is the Chinese patent no. CN1744106. The system described in the said patent includes a console, work tables, quality test charts and communication, application server. Radio frequency identification technique is adopted in the invention to replace the traditional time cards. The data on the radio frequency ID card is read and transmitted to the server side. The invention is suitable for workers to work and for the supervisor to know the current production status in real time. In this patent, it is aimed to calculate the possible effect of the existing personnel number on the production of that day through the cards read by the workers on the production line. The opinion that the invention mentioned in the said patent is mostly designed to monitor the worker status, is dominant.

Another patent come across in the state of the art is the U.S. Pat. No. 6,463,352. A data collection and storage device is mentioned in the said patent.

Another document come across in the state of the art is the American patent no. US2003060904. In the said patent a system that obtains and reports data such as start time of the machine, pause time, etc., by means of a data collection device, to determine the optimum speed at which the production machine can operate, is disclosed.

Turkish patent no. TR2007/01520, which falls within the state of the art, is another study come across in the related field. In the said patent, a data collection device is mentioned. However, there is an opinion that product online time and defective product cannot be distinguished.

Accordingly, it is seen that there are improvements on the textile production monitoring system in the state of the art, but there are deficiencies in the existing systems. In particular, it is seen that there is a need for a system that can distinguish the defective/defect-free products, accurately report on how much work is done on which machines for how long and how much products are produced, calculate the online time, and do not require an undo button.

TECHNICAL PROBLEMS TO BE SOLVED BY THE INVENTION

With the textile production monitoring system of the invention, the aim is a monitoring system which, in the textile production fields with large-scale production volume, especially in textile sewing fields, analyzes the correct information of the products, information such as which operator works on which machines for how long, how much product they produce, failure status, machine efficiency, etc. with the four-signal system and algorithm, evaluates them in a coordinated way and turns them into accurate data in the desired digital environment and processes them. This four-signal system and algorithm mentioned is a system that allows receiving in a coordinated way the signal received from the pedal, the signal received from the sensor located near the sewing needle in the machine, the output signal used to break the thread from the machine main board, the engine speed or knife signal information, and is an evaluation configuration for them. For this purpose, the reporting process is carried out by the production and efficiency management required for detailed examination by presenting the details of all products produced in the digital environment. The invention differs from other monitoring systems based on the counters in the market according to the four-signal system and algorithm.

One of the advantages of the textile production monitoring system of the invention, is that the data generated completely by entering them in the internet environment, can be monitored. Due to this feature, instant work information can be uploaded to the production area, while instant production information can be monitored. The textile production monitoring system of the invention enables remote access with its structure suitable for the Internet of Things network (IoT). Basically, it handles the production monitoring by transferring the correct information to the digital environment. It allows uploading of up-to-date and necessary software by providing the technical service needed in the production processes with remote access over the wireless network, thus saving time and cost, and increasing added value. It also solves the problem that pedal counters in the existing systems cannot detect defective products.

Another advantage of the textile production monitoring system of the invention, is that it can calculate the online time (processing time of the products in a sewing machine) and provides a complete analysis for the operator performance. Thus, the bottleneck analysis can be performed adequately and accurately and high efficiency is provided.

The textile production monitoring system of the invention, particularly in the sector where sewing machines are used, and generally in textile and apparel production, can monitor production in real terms, measure efficiency, monitor and organize work or personnel planning tasks by monitoring a large number of values in a coordinated way (for example, with the four-signal system).

Another advantage of the textile production monitoring system of the invention, is that the system includes a barcode reader. Thus, it will be possible to access information on which order the said product belongs to, as well as information on which product is sewn on which machine and how many minutes it takes.

Another advantage of the textile production monitoring system of the invention, is that it can automatically assign its online time. In the state of the art, the online time has been entering manually by a personnel in charge. In the textile production monitoring system of the invention, it is possible to know which order the product belongs to, and the online time can be assigned automatically accordingly. Thus, the work load of the personnel in charge is greatly reduced.

DESCRIPTION OF THE FIGURES

FIG. —1 The drawing showing as a conceptual design the main elements of the electronic device, with being integrated (or adapted) into a sewing machine which is used in the textile production monitoring system of the invention.

FIG. —2 The drawing showing in the front view the main elements of the electronic device used in the textile production monitoring system of the invention.

Figure 1:
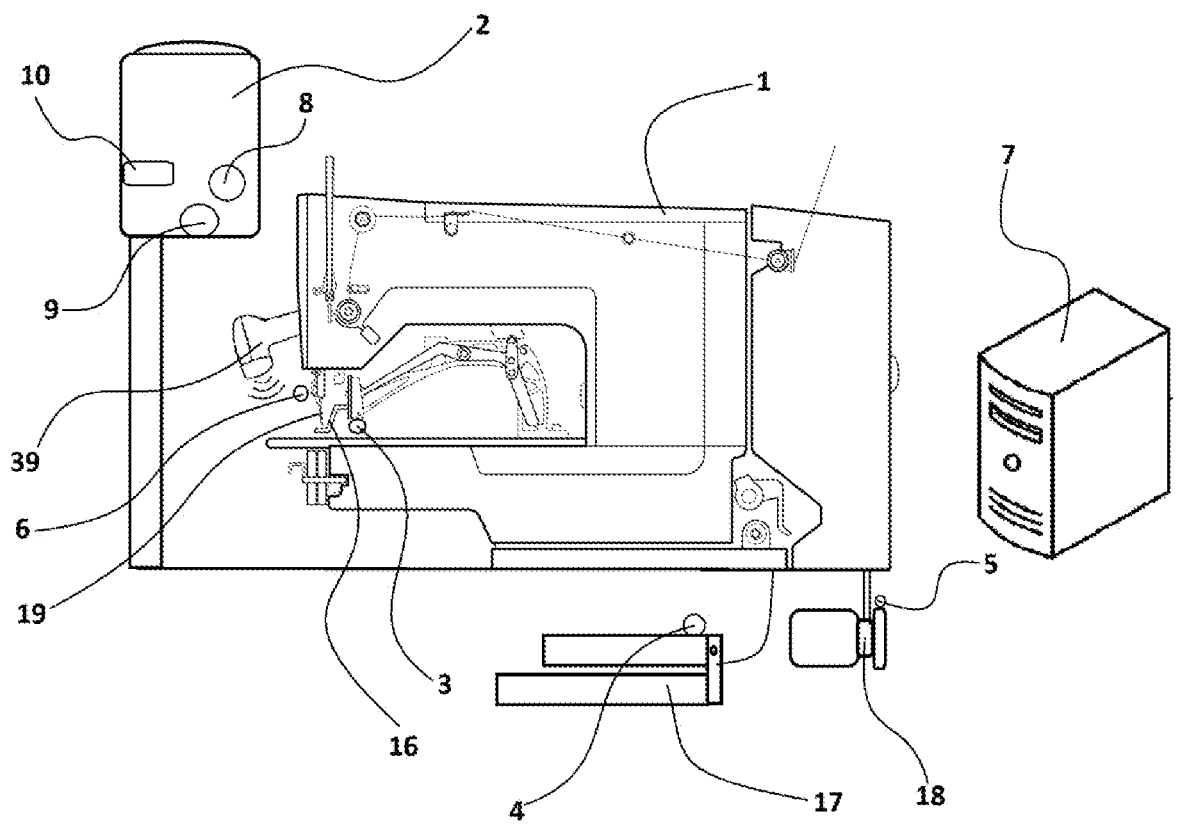
Figure 2:
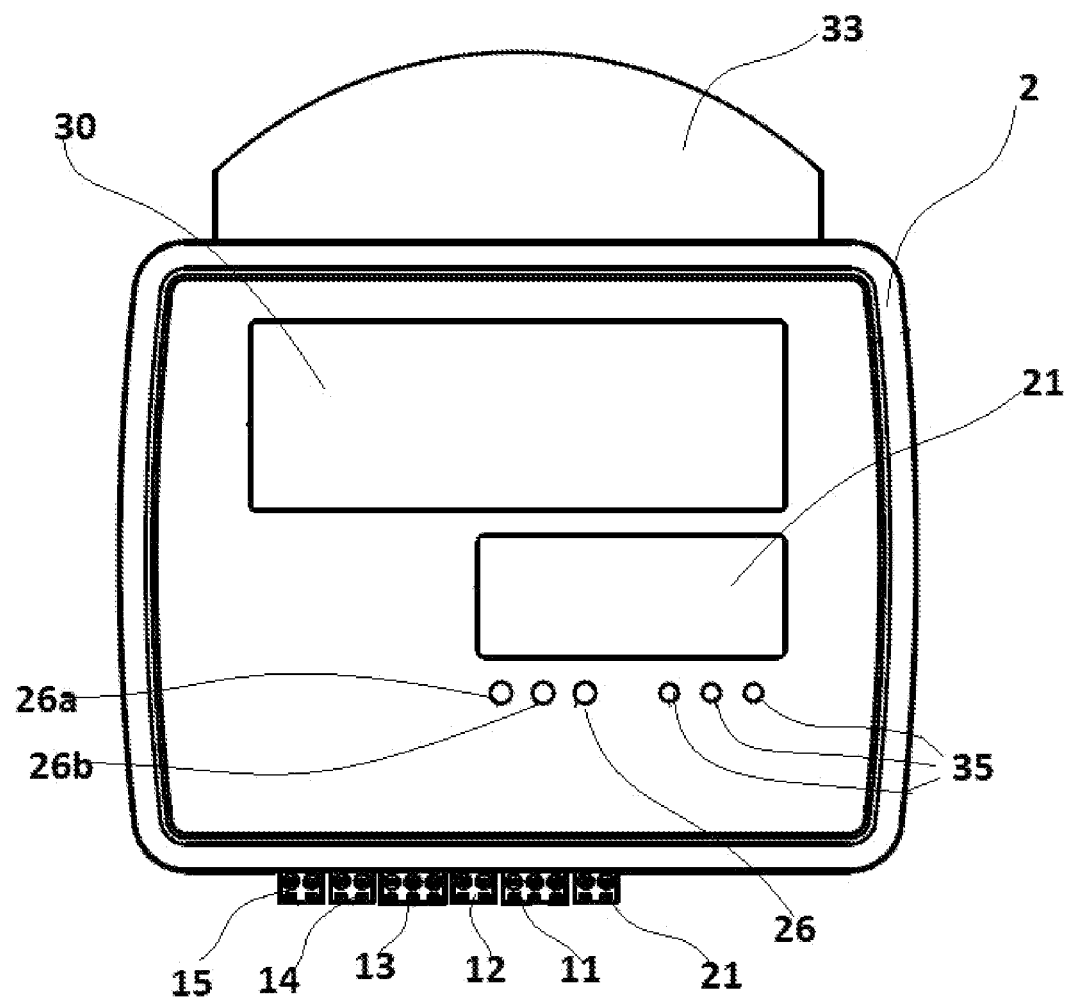
Figure 3:
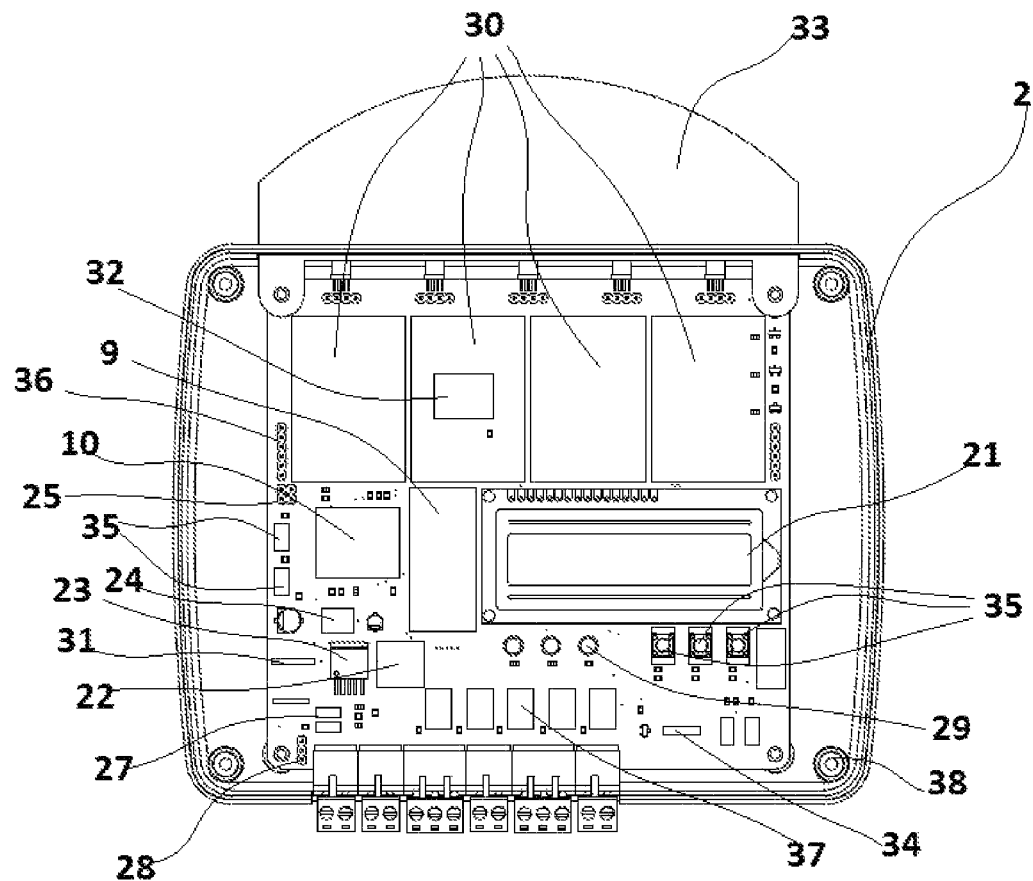
Figure 4:
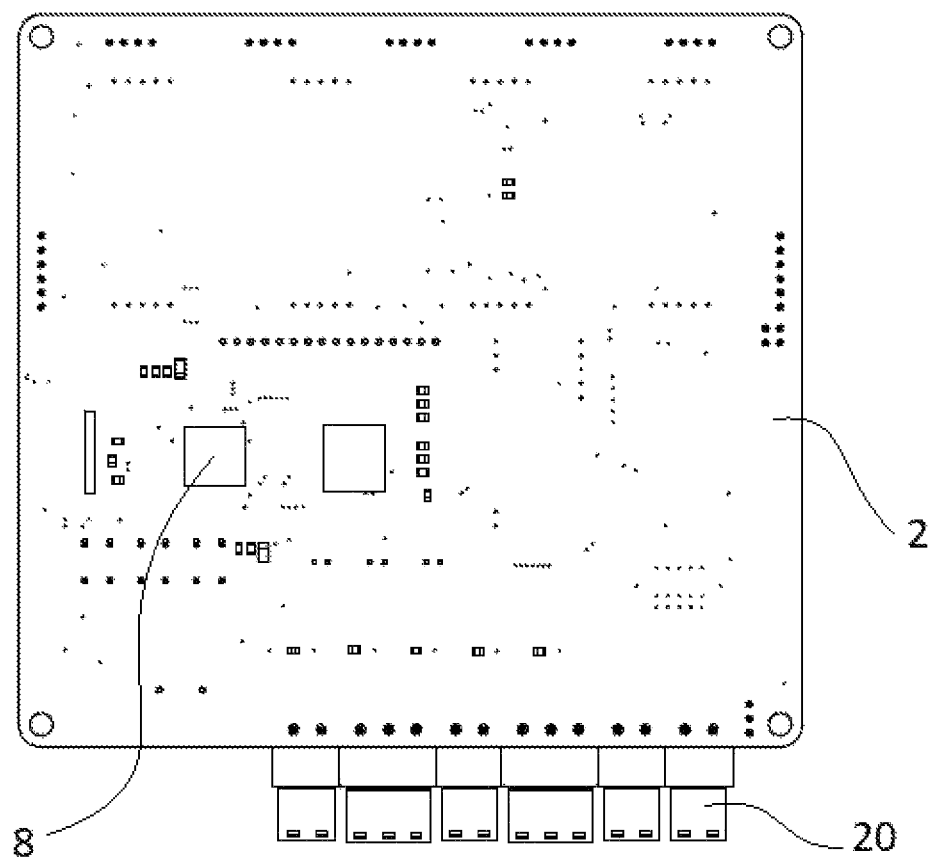
Figure 5:
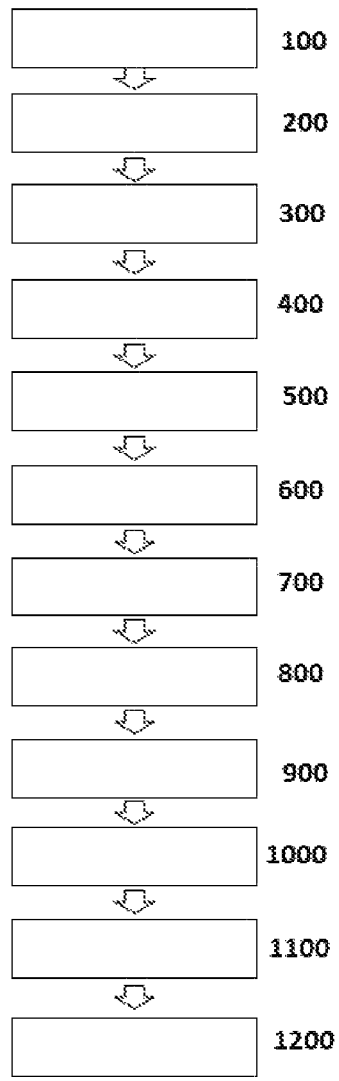

FIG. —3 The front view drawing showing the elements of the electronic device used in the textile production monitoring system of the invention in more detail.

FIG. —4 The drawing in the rear view of the electronic device used in the textile production monitoring system of the invention.

FIG. —5 Shows the algorithm or flowchart of receiving and evaluating information in a coordinated way with four-signal systems in the textile production monitoring system of the invention.

SECTION, PART, AND FLOW REFERENCE NUMBERS TO HELP EXPLAIN THE INVENTION

1—Sewing machine
2—Electronic device
3—First sensor
4—Second sensor
5—Third sensor
6—Fourth sensor
7—Server
8—Microprocessor
9—Rfid module
10—Wireless connection module
11—First signal input
12—Second signal input
13—Third signal input
14—Fourth signal input
15—Fifth signal input
16—Knife
17—Pedal
18—Motor tach
19—Needle
20—Power input
21—LCD screen
22—Coil
23—Converter
24—Regulator
25—Serial port Jumper
26—First Led
   26a—Wifi LED
   26b—Status LED
27—Diode
28—Switch
29—Second LED
30—7-Segment Display
31—Condenser
32—Integrated driver
33—Lighting section
34—Buzzer
35—Button
36—Socket
37—Optocoupler
38—Box fixing point
39—Barcode reader Process Flowchart to Help Explain the Invention 100—Turning on the machine and activation of the electronic device
200—Opening the wireless connection modules
300—Establishing a wireless network connection and requesting the operator to read the card 400—Reading the card by the operator and sending the card information to the server
500—Reading the barcode of the product and obtaining the product information
600—Operating the machine according to the production information and activation of four signals
700—Receiving and evaluating the signal from the pedal
800—Receiving and evaluating the signal from the engine
900—Receiving and evaluating the signal from the needle
1000—Receiving and evaluating the signal from the knife
1100—Evaluating of the signals received from the Pedal, Motor, Needle and Knife in a coordinated way
1200—Restarting the process for the next operation

DETAILED DESCRIPTION OF THE INVENTION

With the textile production monitoring system of the invention, it is aimed a system that basically determine and report the correct product information and how much work is done on which machines for how long, how much product is produced in the production areas, in a coordinated way with the four-signal system, is suitable for the remote access and updating, can measure the online time correctly and does not need an undo button. Based on this main purpose, the four-signal system and algorithm are used. Although the textile production monitoring system of the invention is mainly applied in the fields of sewing machine in textile, it can be applied in all textile fields or in fields other than textiles. Textile, sewing machine fields and sewing machine are only for embodying and understanding the subject. Therefore, they should be non-limiting.

The main structure of the textile production monitoring system of the invention, is seen as a conceptual design of the integrated system with the sewing machine given in FIG. —1. FIG. —2, FIG. —3 and FIG. —4 show the drawings of the electronic device used in the textile production monitoring system of the invention. In FIG. —5, the algorithm or flowchart showing how the four-signal system works, is seen.

The textile production monitoring system of the invention basically comprises an electronic device (2) connected with the sewing machine (1), the first sensor (3) connected with the knife (16) transmitting one of the signals to the said electronic device (2), the second sensor (4) connected with the pedal (17) transmitting the other one of the signals to the said electronic device (2), the third sensor (5) connected with the motor tach (18) of the sewing machine transmitting another one of the signals to the said electronic device (2), the fourth sensor (6) connected with the needle (19) transmitting another one of the signals to the said electronic device (2), and detecting whether there is a product in the machine at that moment, a microprocessor (8) evaluating the four signals received form the said first sensor (3), the second sensor (4), the third sensor (5) and the fourth sensor (6) in a coordinated way, and comprising a software possessing a four-signal algorithm which allows to generate the correct information of the products, information on which operator works on which machines for how long, how much product they produce, failure status, machine efficiency, a Rfid module (9) connected with the said electronic device (2) and allowing monitoring the information and working status of the personnel working on the said sewing machine (1), at least one barcode reader (39) allowing entering to the system the information on which order the product sewn in the said sewing machine (1) belongs to, a wireless connection module (10) allowing transferring the information from the said electronic device (2) and the said microprocessor (8) wirelessly, a server (7) connected with the said wireless connection module (10) and controlling and evaluating the exchange of information with the external environment.

Of course, the textile production monitoring system of the invention does not only comprise the elements given above. It will also comprise the electronic elements existing in the state of the art and required for the operation of the said electronic and software system. In addition to these, it also comprises the elements such as LCD or LED displays, buttons, condensers. Accordingly, given that all the essential electronic elements, the system basically comprises an electronic device (2) connected with the sewing machine (1), at least one microprocessor (8) which has the software containing the four-signal algorithm in the said electronic device, a power input (20) supplying energy to the device, at least one wireless connection module (10) providing communication and data transfer of the device with the remote server and the supervisor, at least one LCD screen (21) informing the machine operator and displaying the sections on the device interface such as the menu, at least one RFID module (9) detecting the remote reading of the card which is used by the machine operator to identify himself/herself working on the respective machine, at least one barcode reader (39) reading the barcode on the product and entering the order number of the product into the system, at least one coil (22) storing energy in the magnetic field when current is passed through it, and regulating 5V voltage, at least one switched voltage dropper converter (23) reducing the supply voltage to 5V, at least one voltage regulating regulator (24), at least one serial port jumper (25) allowing the wireless connection module to be entered in programming mode, at least one wifi LED (26a) indicating that the wireless connection is established, a status LED (26b) indicating the operating status of the device, at least one first LED (26) indicating the failure status on the device, at least one diode (27), at least one switch (28) enabling the device supply to be opened and closed, at least one second LED (29) generating alert colors on the device, one 7-segment display (30) displaying the units digit of the counter, another 7-segment display (30) displaying the tens digit of the counter, another 7-segment display (30) displaying the hundreds digit of the counter, another 7-segment display (30) displaying the thousands digit of the counter, a condenser (31) regulating the supply voltage, a second condenser (31) regulating the supply voltage, a third condenser (31) regulating the supply voltage, at least one integrated driver (31) enabling to control the LCD screen from the processor driver interface, at least one lighting section (33), at least one buzzer (34) providing sound alarm, a button (35) for resetting the microcontroller, at least one socket (36) for programming the microcontroller, at least another button (35) for resetting the number of products produced in the device, at least another button (35) allowing the device to be entered into standby mode, at least another button (35) receiving data from the database, at least one radio frequency identification RFID Module (9) reading the personnel cards, at least another socket (36) used to program the microcontroller via USB, another button (35) used to reset the said wireless connection module (10), another button (35) allowing the said wireless module (10) to be entered into program mode, at least another socket (36) used to program the said wireless module (10), at least another button (35) allowing the microcontroller to be entered into programming mode, at least one optocoupler (37) providing optical isolation of the first signal input (11), at least another optocoupler (37) providing optical isolation of the second signal input (12), at least another optocoupler (37) providing optical isolation of the of the third signal input (13), at least another optocoupler (37) providing optical isolation of the fourth signal input (14), at least another optocoupler (37) providing optical isolation of the AC current sensor input, at least one box fixing point (38), at least one integrated driver (20) for the integrated operation of the circuit, the first sensor (3) where the signal received from the knife (16) is generated, and the first signal input (11) where this signal enters, the second sensor (4) where the signal received from the pedal (17) is generated and the second signal input (12) where this signal enters, at least one third sensor (5) where the signal received from the engine tach (18) is generated, the third signal input (13) where this signal enters, the fourth signal input (14) where the signal from the fourth sensor (6) where the signal received from the needle (19) is generated, and a fifth signal input (15) where the signal received from the AC sensor enters. The numbering of some equipment used in the system of the invention has not been changed since similar equipment is used. For example; since equipment such as buttons, sockets, optocouplers are used more than once in different places, there is no need to number all of them separately. On the other hand, elements other than the electronic elements mentioned above can also be used. Importantly, it should has a structure allowing this to be provided with a microprocessor (8) containing software therein, in order to receive the correct signals in a coordinated way via the sensors (the first sensor, second sensor, third sensor and fourth sensor) from the knife (16), pedal (17), motor tach (18) and needle (19) with the electronic device (2) integrated in the sewing machine (1), that is, allowing the signals to be received in a way that they complement each other and provide more detailed monitoring of the operation.

The textile production monitoring system of the invention is basically designed for a production area with a sewing machine. It should be accepted that descriptions based on the sewing machines in the above and following explanations can also be applied to all textile machines in general or other machines in the production area. Namely; The sewing machine (1) here is a textile machine and consequently should be interpreted as a machine tool and workbench. In this regard, the knife (16) is a sewing machine knife, but should not be interpreted only as a knife in a sewing machine, but as a cutting element in any machine tool. Similarly, pedal (17) is a sewing machine pedal, but should be interpreted not only as a pedal, but also as a pressing or pulling device, button, etc. that starts an operation. The motor tach (18) in the system may be a motor that can measure or converts the energy on a work machine or bench into motion, a motion sensor associated with the motor, etc. Similarly, the needle (19) should be interpreted not only as a needle, but also as a tool element such as a punching tool tip, a soldering tip. The barcode reader (39) is a reader that will allow the design (barcode) to be contained on the product, preferably on the label, to be read and to be entered into the system, this reading process will be performed over the device with various communication protocols (preferably RS485 port or Profinet (Ethernet)). Consequently, the object of the invention is to evaluate not only a single movement or function, but also the signals received from a multiple machine tool and the related operator, and to obtain a large number of monitorable data.

The textile production monitoring system of the invention basically is a microprocessor (8) controlled device that evaluates the data it receives from the external elements to which it is connected and performs the necessary calculations and determinations by means of its four-signal algorithm. Here, the external elements are the sewing machine (1) and the knife (16), the pedal (17), the motor tach (18) and the needle (19) connected with it. Information such as production amount, production rate based on the product number, total pause time is automatically obtained from the machines by connecting to the production machines in the state of the art via an encoder, digital output or tachogenerators. However, here, unlike the state of the art, these values are received in a coordinated way and evaluated by the algorithm (workflow) determined in the software of the microprocessor (8). Thus, in addition to the values such as production amount, production rate based on the product number, total pause time, the number of strokes, number of revolutions, flow, pause, etc., can be monitored from the given machines instantaneously, the collected signals are evaluated and values such as the actual product number, production rate, consumption amounts are calculated. The obtained data is instantaneously transferred to the server (7) with the wireless internet module (10) and transmitted to the desired location therefrom. Of course, if desired, a wired system can also be used instead of the wireless connection module (10). However, the wireless system was preferred since it is more advanced and allows mobility. On the other hand, there may be other systems as the wireless connection module (10) as well as Wifi systems. If desired, information can be transferred directly to a desired computer or electronic device with the wireless connection module (10) without using the server (7) in the system. In the said system, it is possible to provide management by a supervisor by monitoring the situation during operation visually.

As an additional development, the textile production monitoring system of the invention can read the information on the order number of the product with the barcode reader (39) it contains, so that the information on which order, lot (group, batch) or size the product belongs to, can be accessed. The textile production monitoring system of the invention has a structure that determines the product online time, i.e. the duration of processing of a product by the operator of the working machine, as mentioned above, which cannot be estimated by the other devices in the field, and according to this information determines whether the related product is defective or defect-free product, as a result of compiling and interpreting the sensors and the signals received from five different inputs according to the four-signal system and algorithm by the algorithm and software contained by the device. In the textile production monitoring system of the invention, it is possible to determine which order the product belongs to with the barcode reader (39) and the cycle time can be assigned automatically. The textile production monitoring system of the invention provides technical superiority in the market due to all these features. The textile production monitoring system of the invention has been developed based on the counter that calculates the number of products produced by the machine operator based on the pedal counters existing in the market, and the electronic system displays the counter data in the screen. In textile production factories, the working performance of the operator working on the machine and the overall product number are shown on the displays connected to each operator's machine on a daily basis, but since they are based on the logic of pressing the pedal, currently they are insufficient in the machines operating without pedals and since they perform only one function, the other desired points important in terms of efficiency cannot be measured such as the defective product information, personnel productivity, time spent on a product.

In FIG. —1, FIG. —2, FIG. —3 and FIG. —4 there is a conceptual design showing the main structure of the electronic device used in the textile production monitoring system of the invention. Online time and defective product detection which cannot be performed by the prior arts can be performed with a single device by means of the algorithm generated by the combination of the software contained by the programmable microprocessor (8) and the electronic circuit elements in the electronic device (2). The invention works according to the four-signal algorithm. These are the pedal counter, a sensor that detects whether there is a thread or not, the knife signal, the signal of the engine speed counter. The device processing these four signals with the software therein, in the light of these data, displays the performance of the operator on the LCD screen (21) at the head portion of the machine of the related operator, based on the value ranges determined by the supervisor. Here, the display is not limited to LCD, it may be LED display, tube displays or displays produced with other technologies. The type of display is non-limiting. The term "LCD display" is for machine or electronic part nomenclature only. The supervisor (the personnel in the production area) can easily see how much an operator works and give feedback by simply looking at the colors in the lighting section (33). The invention can collect and compile more than one data from the textile machine to which it is integrated and transmit it to the supervisor with its wireless internet module (8). Thus, long-term working performance of each personnel, bottleneck information (detection of the operator slowing down the system in the production line), product online time and defective product can be detected simultaneously.

Thanks to all the hardware equipment of the production monitoring system of the invention, data obtained from the signals from the sensors that detect the work completion status of the machines, the switch and the machine main board, is displayed on the 7-segment display (30) on the device. The system also sends these data displayed to the server (7) with the wireless connection module (10) contained in the device. The production monitoring system of the invention, has a plug-and-play feature and can be integrated into the production facility without the need for improvement on the machine.

The production monitoring system of the invention receives the energy required for its operation from the power supply connected with the power input (20), which completes its architecture. The device also works in harmony with RFID (radio frequency recognition) and lora (Long range) technologies. Thus, the production personnel communicate with the RFID module (9) by reading his/her card that he/she has started working. This operation exists in the state of the art. However, coordinated evaluation with all sensors and obtaining information from them is one of the characteristic features of the invention.

In the system of the invention, each production personnel have his/her own lora (long distance contactless card) card. Each production personnel can be monitored by means of this card. Thereby, it is understood how long each employee takes a break from daily work (including when he/she stops/does not work). The production monitoring system of the invention ensures the periodic-quality-systematic operation of the factory, thus increasing the efficiency. With the production monitoring system of the invention, it is possible to catch the problems in production early and to intervene quickly. Thus, workforce loss is prevented.

By using the wireless connection module (10) in the system of the invention, it is ensured that the textile Production Monitoring System device is instantaneously monitored in real time, examined and analyzed and intervened. In this way, remote software updates can be performed. In this way, a new software can be integrated quickly and safely every time the production line is changed. It is possible to transfer all the data of the textile production monitoring system to the internet environment. After the data is transferred to the server (7), it is aimed to ensure high efficiency and to reduce the cost by using the system interface. It is possible to monitor the system and eliminate the problems encountered quickly with the immediate data transferred to the server (7).

The textile production monitoring system of the invention, comprises basically an electronic device (2) connected with the sewing machine (1), the first sensor (3) connected with the knife (16) transmitting one of the signals to the said electronic device (2), the second sensor (4) connected with the pedal (17) transmitting the other one of the signals to the said electronic device (2), the third sensor (5) connected with the motor tach (18) of the sewing machine transmitting another one of the signals to the said electronic device (2), the fourth sensor (6) connected with the needle (19) transmitting another one of the signals to the said electronic device (2), and detecting whether there is a product in the machine at that moment, a four-signal algorithm or flow system evaluating four signals received from the said first sensor (3), the second sensor (4), the third sensor (5) and the fourth sensor (6) in a coordinated way and allowing generating the correct information of the products and information on which operator works on which machines for how long, how much product they produce, failure status, machine efficiency. The evaluation of the said four signals is performed according to the following algorithm or flow. Namely;

100—Turning on the machine and activation of the electronic device
200—Opening the wireless connection modules
300—Establishing a wireless network connection and requesting the operator to read the card
400—Reading the card by the operator and sending the card information to the server
500—Reading the barcode of the product and obtaining the product information
600—Operating the machine according to the production information and activation of four signals
700—Receiving and evaluating the signal from the pedal
800—Receiving and evaluating the signal from the engine
900—Receiving and evaluating the signal from the needle
1000—Receiving and evaluating the signal from the knife
1100—Evaluating of the signals received from the Pedal, Motor, Needle and Knife in a coordinated way
1200—Restarting the process for the next operation This algorithm or flowchart described above is a general operation of the system. The stage and/or process details of this operation are given below;

Stage of Turning on the Machine and Activation of the Electronic Device (100)

At this stage, the Machine is turned on and the electronic device (2) is activated. Here, the machine is the sewing machine (1), but it may vary according to the industry or production area to which the system is adapted.

Stage of Opening the Wireless Connection Module (200)

By enabling the wireless connection module (10) to be turned on, the system is made ready to perform functions such as data exchange with the system, and updating.

Stage of Establishing a Wireless Network Connection and Requesting the Operator to Read the Card (300)

At this stage, the wireless connection is established and the operator is requested to read the card in the RFID reader module (9) in order to ensure that the operation is performed by the correct operator.

Stage of Reading the Card by the Operator and Sending the Card Information to the Server (400)

At this stage, the operator reads his/her card in the RFID reader module (9) and the card information is sent to the server (7). Thus, the operator's work machine (textile machine) and operation are verified.

Stage of Reading the Barcode of the Product and Obtaining the Product Information (500)

Information such as the order number, lot number, online time etc. related to the product is defined in the barcode. At this stage, the barcode on the label is read by the barcode reader (39) and the product information is sent to the system via the wireless connection module (10). Reading is performed over the device, preferably via the R485 port or profinet communication protocols. However, it is also possible to use different communication protocols. As can be seen in FIG. —1, the barcode reader (39) is preferably located next to the sewing machine, directly where the sewing point is visible. The barcode reader (39) should see the sewing point of the product and preferably it should be at the needle level. The barcode where the product information is defined will be placed on the label. The label can be a product label containing the information such as washing instruction, or a separate label can be used containing the barcode only. The label can be sewn to the product, or the label and can come separately and be sewn at this stage. Firstly, entering the information on the product into the system by reading the barcode on the label is important. The barcode reading is must be performed for each different product. In other words, when the barcode of the first product is read for an order, the following products will not need to be read, and the read products will be recorded as products of the same order. However, for a different order, the barcode of the first product will be read.

Stage of Operating the Machine according to the Production Information and Activation of Four Signals (600)

At this stage, the operation is verified by obtaining the production information, operator and online times. Thus, the system is ready for real operation and simultaneous monitoring of four signals.

Stage of Receiving and Evaluating the Signal from the Pedal (700)

At this stage, the process is started according to the determined operation conditions from the moment the pedal (17) is pressed, and the monitoring is continued until the operation is paused or completed somehow. This process is followed by receiving information from the second sensor (4). In fact, the order of the sensor is not important. The important thing is to monitor the pedal from a sensor. The same is applied to the other sensors.

Stage of Receiving and Evaluating the Signal from the Engine (800)

At this stage, the status from the engine tach (18) is monitored with the third sensor (5) and the exchange of data on whether the motor complies with the determined operation conditions or not, or the efficiency is monitored.

Stage of Receiving and Evaluating the Signal from the Needle (900)

At this stage, the status of the needle (19) is monitored by the fourth sensor (6) and the exchange of data on whether it complies with the operation conditions or not, or the efficiency is monitored. Status like breaking of the thread is also monitored here.

Stage of Receiving and Evaluating the Signal from the Knife (1000)

At this stage, the knife (16) is monitored by the first sensor (3) and the exchange of data on whether it complies with the operation conditions or not, and the efficiency are monitored. For the knife to activate, the operation must be completed or a faulty process must be completed.

Stage of Evaluating of the Signals Received from the Pedal, Motor, Needle and Knife in a Coordinated Way (1100)

This stage actually is the stage determining that the previous stages, namely stages of receiving and evaluating the signal from the pedal (700), receiving and evaluating the signal from the engine (800), receiving and evaluating the signal from the needle (900) and receiving and evaluating the signal from the knife (1000) are performed in a coordinated way. These stages mentioned above, namely stages of receiving and evaluating the signal from the pedal (700), receiving and evaluating the signal from the engine (800), receiving and evaluating the signal from the needle (900) and receiving and evaluating the signal from the knife (1000), are not consecutive stages, but are the stages that work in a coordinated way and send information to the system and measure, evaluate, conduct or determine how to perform the operation details complementing each other or controlling each other's data, and help reporting.

Restarting the Process for the Next Operation (1200)

With this stage, an operation is monitored correctly as being efficient or inefficient, or an operation is correctly recorded as a faulty process and the next operation is continued. The next operation may be a similar operation. That is, the operations are repeated continuously in light of the conditions mentioned above by means of repeating the operations in a production facility.

INDUSTRIAL APPLICABILITY OF THE INVENTION

The textile production monitoring system of the invention is designed to be integrated into the production lines of the textile companies which already make production or to re-establish a production line from scratch. The existing systems will be integrated into the existing system in these facilities in accordance with the modernized production purposes on the production lines in the context of Industry 4.0 revolution, and will make the existing system smart, efficient, modern and centrally monitorable. The system can be applied to the other sectors as well as all textile fields.

The invention claimed is:
1. A textile production monitoring system comprising:
   a sewing machine having a pedal and a knife and a motor tach and a needle;
   an electronic device connected to said sewing machine;
   a first sensor connected to the knife, said first sensor adapted to transmit a first signal to said electronic device;
   a second sensor connected to the pedal, said second sensor adapted to transmit a second signal to said electronic device;
   a third sensor connected to the motor tach, said third sensor adapted to transmit a third signal to said electronic device;
   a fourth sensor connected to the needle, said fourth sensor adapted to transmit a fourth signal to said electronic device;
   a microprocessor receiving the first signal and the second signal and the third signal and the fourth signal, said microprocessor connected to said first sensor and said second sensor and said third sensor and said fourth sensor, said microprocessor having software therein, the software having a four signal algorithm configured to generate information pertaining to products and to a duration of a particular operator on a particular machine and a rate of product production and a failure status and a machine efficiency;
an RFID module connected to said electronic device, said RFID module adapted to allow monitoring of information and working status of personnel working on said sewing machine;
at least one barcode reader cooperative with said electronic device so as to allow entry of information as to an order to which the product is to be sewn on said sewing machine;
a wireless connection module adapted to transfer information wirelessly from said electronic device and said microprocessor; and
a server connected to said wireless connection module so as to control and evaluate an exchange of information with an external environment.

2. The textile production monitoring system of claim 1, wherein said sewing machine is one of a textile machine, a machine tool and a workbench.

3. The textile production monitoring system of claim 2, wherein the knife is a cutting element of the machine tool.

4. The textile production monitoring system of claim 1, wherein the pedal is a pressing or pulling device.

5. The textile production monitoring system of claim 1, wherein the motor tach is a motor that measures or converts energy into motion.

6. The textile production monitoring system of claim 1, wherein the needle is either a sewing machine needle or a tool element in which the tool element has a punching tool tip or a soldering tip.

7. The textile production monitoring system of claim 1, further comprising:
a microprocessor-controlled device adapted to evaluate data from the external elements and to perform calculations and determination by the four signal algorithm.

8. The textile production monitoring system of claim 7, wherein the external elements are said sewing machine and the knife and the pedal and the motor tach and the needle thereof.

9. A textile production monitoring method comprising:
a sewing machine having a pedal and a knife and a motor tach and a needle;
a electronic device connected to said sewing machine;
a first sensor connected to the knife, said first sensor adapted to transmit a first signal to said electronic device;
a second sensor connected to the pedal, said second sensor adapted to transmit a second signal to said electronic device;
a third sensor connected to the motor tach, said third sensor adapted to transmit a third signal to said electronic device;
a fourth sensor connected to the needle, said fourth sensor adapted to transmit a fourth signal to said electronic device;
a four-signal flow system receiving the first signal and the second signal and the third signal and the fourth signal in a coordinated manner so as to generate information pertaining to products and to a duration of a particular operator on a particular machine and a rate of product production and a failure status and a machine efficiency, the textile production monitoring method comprising:
turning on said sewing machine;
activating said electronic device;
opening a wireless connection module;
establishing a wireless network connection;
requesting an operator to read a card;
reading the card by the operator;
sending information from the card to said server;
reading a barcode by said at least one barcode reader so as to obtain product information;
operating said sewing machine according to the product information and according to the first sensor, the second sensor, the third sensor and the fourth sensor;
receiving and evaluating the second sensor from the pedal;
receiving and evaluating the third sensor from the motor tach;
receiving and evaluating the fourth sensor from the needle;
receiving and evaluating the first sensor from the knife, the steps of receiving and evaluating being in a coordinated manner; and
restarting the method for a next operation.

10. The textile production monitoring method of claim 9, further comprising:
performing a data exchange function; and
updating by enabling the wireless connection module to be turned on when opening the wireless connection module.

11. The textile production monitoring method of claim 9, wherein the step of requesting the operator to read the card is in said RFID reader module.

12. The textile production monitoring method of claim 11, wherein the step of reading the card by the operator comprises:
verifying said sewing machine by the operator and sending the card information to the server.

13. The textile production monitoring method of claim 9, wherein the step of reading the barcode comprises:
forming the barcode on a label;
reading the barcode on the label by said at least one barcode reader; and
sending the product information on the read barcode via the wireless connection module.

14. The textile production monitoring method of claim 9, wherein the step of reading the barcode is via an R485 port or by a profinet communication protocol.

15. The textile production monitoring method of claim 9, further comprising:
verifying the operation by obtaining the product information and operation and online times.

16. The textile production monitoring method of claim 9, further comprising:
starting the method according to the predetermined operation condition at a time that the pedal is pressed;
continuing the monitoring until the method is paused or completed;
receiving information from said second sensor during the step of receiving and evaluating the second sensor from the pedal.

17. The textile production monitoring method of claim 9, further comprising:
monitoring a status from the motor tach with said third sensor; and exchanging data on whether the motor tach complies with predetermined operation conditions.

18. The textile production monitoring method of claim 9, further comprising:

monitoring a status of the needle by said fourth sensor; and exchanging data as to whether the status complies with operation conditions.

19. The textile production monitoring method of claim 9, further comprising:

monitoring a status of the knife by said first sensor; and exchanging data as to whether the status complies with operation conditions.

20. The textile production monitoring method of claim 9, further comprising:

categorizing the operations as efficient or inefficient.

21. The textile production monitoring method of claim 9, further comprising:

recording the operation as a faulty process.

* * * * *